Nov. 25, 1941.    J. A. HODGSON    2,263,698
SAFETY BAR FOR AUTOMOBILES
Filed May 10, 1941    2 Sheets—Sheet 1
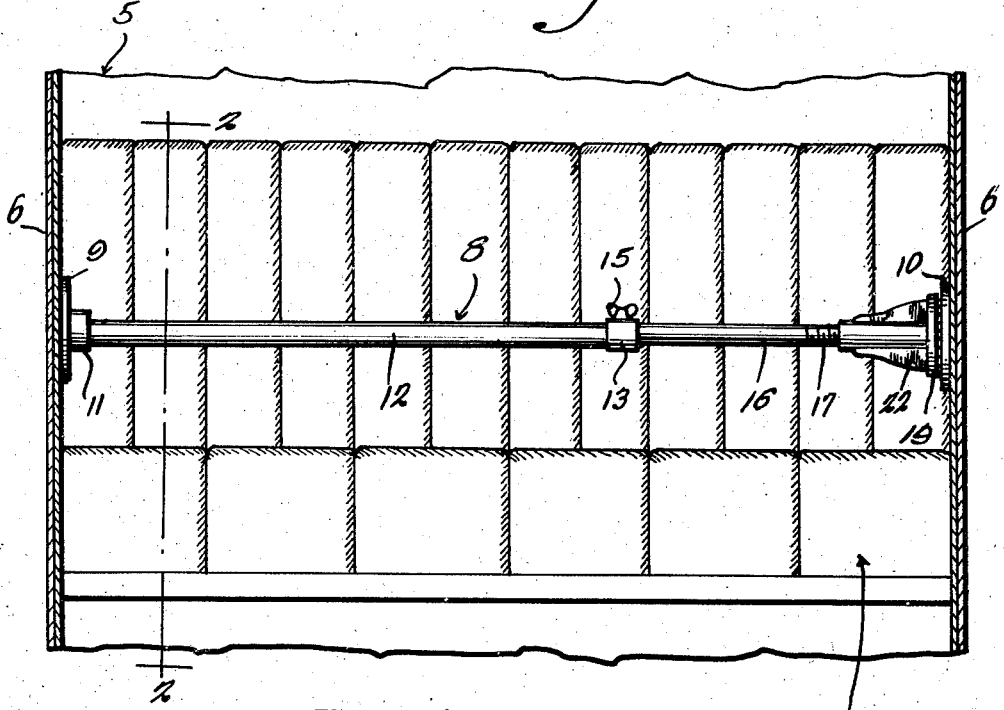
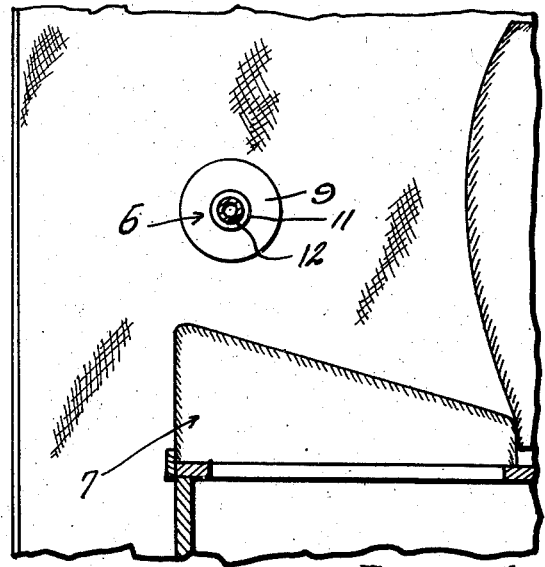
Inventor
James A. Hodgson
By Clarence A. O'Brien
Attorney Nov. 25, 1941.      J. A. HODGSON      2,263,698
SAFETY BAR FOR AUTOMOBILES
Filed May 10, 1941      2 Sheets-Sheet 2
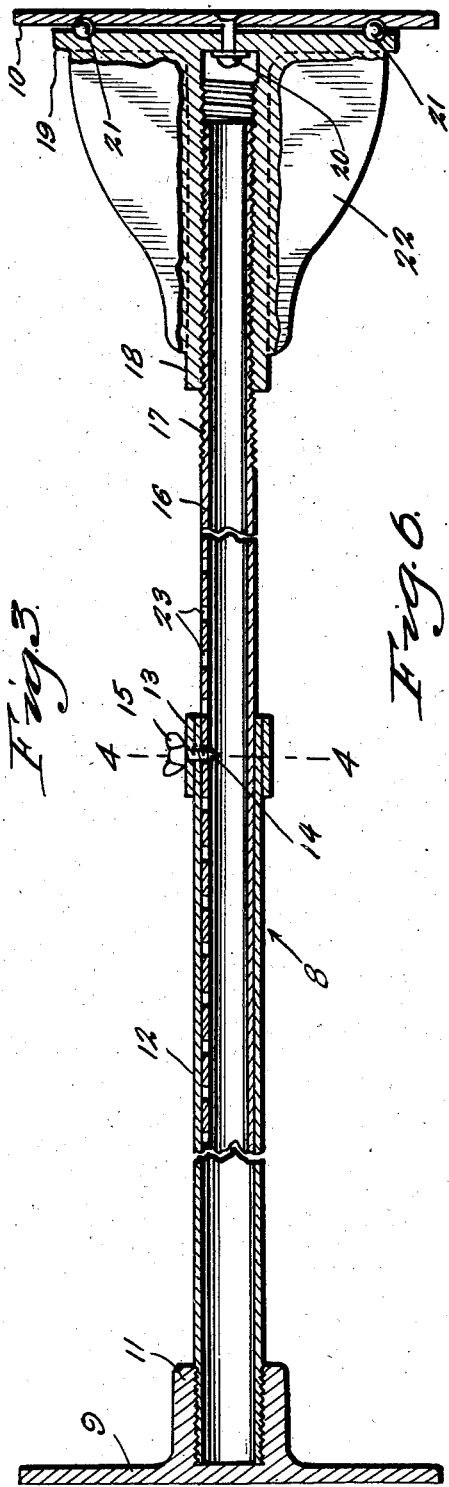
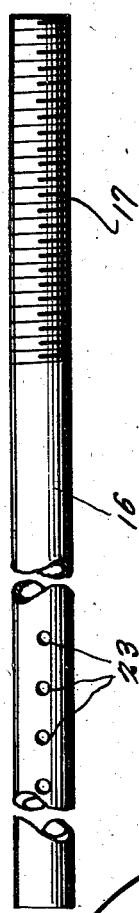
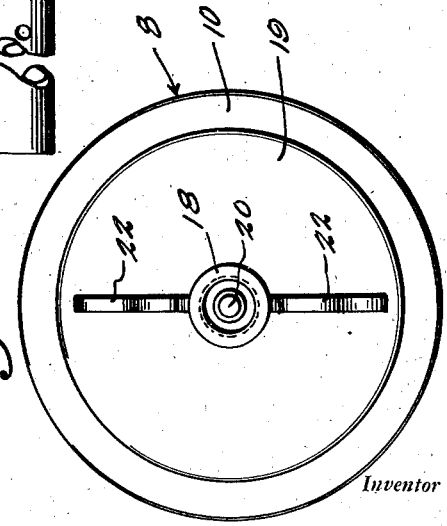
Inventor
James A. Hodgson
By Clarence A. O'Brien
Attorney Patented Nov. 25, 1941

2,263,698

UNITED STATES PATENT OFFICE 2,263,698

SAFETY BAR FOR AUTOMOBILES

James A. Hodgson, Detroit, Mich.

Application May 10, 1941, Serial No. 392,957

1 Claim. (Cl. 280—150)

This invention relates to new and useful improvements in safety appliances for automobiles and more particularly to a safety bar for interposition between the side walls of an automobile body so as to prevent occupants and especially children from tumbling off of a seat when the driver is forced to make a quick stop.

The principal object of the present invention is to provide a safety appliance of the character stated which can be readily set up in an automobile without modification of the automobile construction.

Another important object of the invention is to provide a safety appliance of the character stated which can be readily installed and removed with a minimum amount of effort.

Other objects and advantages of the invention will become apparent to the reader of the following specification.

In the drawings:

Figure 1 represents a fragmentary vertical sectional view through the rear passenger compartment of an automobile showing the safety bar installed.

Figure 2 is a fragmentary vertical sectional view taken substantially on the line 2—2 of Figure 1.

Figure 3 is a longitudinal sectional view through the safety bar.

Figure 4 is a cross section on the line 4—4 of Figure 3.

Figure 5 is an end elevational view looking at the turn section.

Figure 6 is a fragmentary side elevational view of the perforated tube.

Referring to the drawings, wherein like numerals designate like parts, it can be seen that numeral 5 generally refers to an automobile body having side walls 6, 6 between which a seat structure generally referred to by numeral 7 is located and between which and over the seat structure the present safety appliance generally referred to by numeral 8 is installed.

This appliance 8 consists of a pair of end plates 9, 10 which press against the inner sides of the side walls 6, 6 when the appliance is properly installed. The plate 9 has a threaded socket 11 for receiving the threaded end of an elongated tube 12, the outer end of which has a collar or the like 13 welded or otherwise fixed thereto. This end of the tube 12 and the collar 13 has a threaded bore therethrough for accommodating a pointed and threaded element 14 having a winged head 15. The foregoing structure represents one unit of the appliance. The second unit consists of an elongated tube 16 having an elongated threaded portion 17 for threaded engagement in an elongated internally threaded barrel 18 which has a radially disposed plate or disk 19 at its end opposed to the plate 10. The plates 19 and 10 are swivelly connected together by a pin or the like 20 and the opposed faces of these plates 19 and 10 are grooved to accommodate ball-bearings or the like 21. Hand engageable webs 22 extend radially from the barrel 18 and substantially from one end of the barrel to merge with the plate 19.

This tube 16 has the major portion of its length formed with longitudinally spaced openings 23, this portion is slidably disposed in the aforementioned tube 12.

It can now be seen that first the entire assembly is set upon the seat 7 and lengthened by leading the screw 14 outwardly until the pointed end is removed from the adjacent opening 23 of the tube 16. The tubes 12 and 16 can now be extended until the plates 9 and 10 are engaging the walls 6, 6. The entire apparatus can now be lifted to the desired height so that children's legs can pass thereunder and over the edge portion of the seat 7. When the proper elevation of the appliance is determined, the head 15 of the screw 14 can be turned downwardly to pass into the desired opening 23 to fix the approximate length of the appliance. After this, the operator starts turning the barrel 18 by the web 22 resulting in a further extension of the appliance and the clamping of the plates 9 and 10 against the inner sides of the side 6, 6.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A safety appliance for automobiles of the nature described comprising a pair of pressure plates, a tube extending from one of the pressure plates, a telescopic tube adjustably connected with the first-mentioned tube and provided with a threaded outer end portion, a nut on the threaded outer end portion of the second-named tube, a third plate carried by the nut, a swivelled connection between the plate on the nut and the remaining plate, and hand engageable means extending from the nut carried plate to the nut proper to facilitate turning of the nut.

JAMES A. HODGSON.